No. 893,795. PATENTED JULY 21, 1908.
C. L. GOEHRING & W. TROCHE.
GLASS GRINDING MACHINERY.
APPLICATION FILED JUNE 1, 1906.
10 SHEETS—SHEET 4.
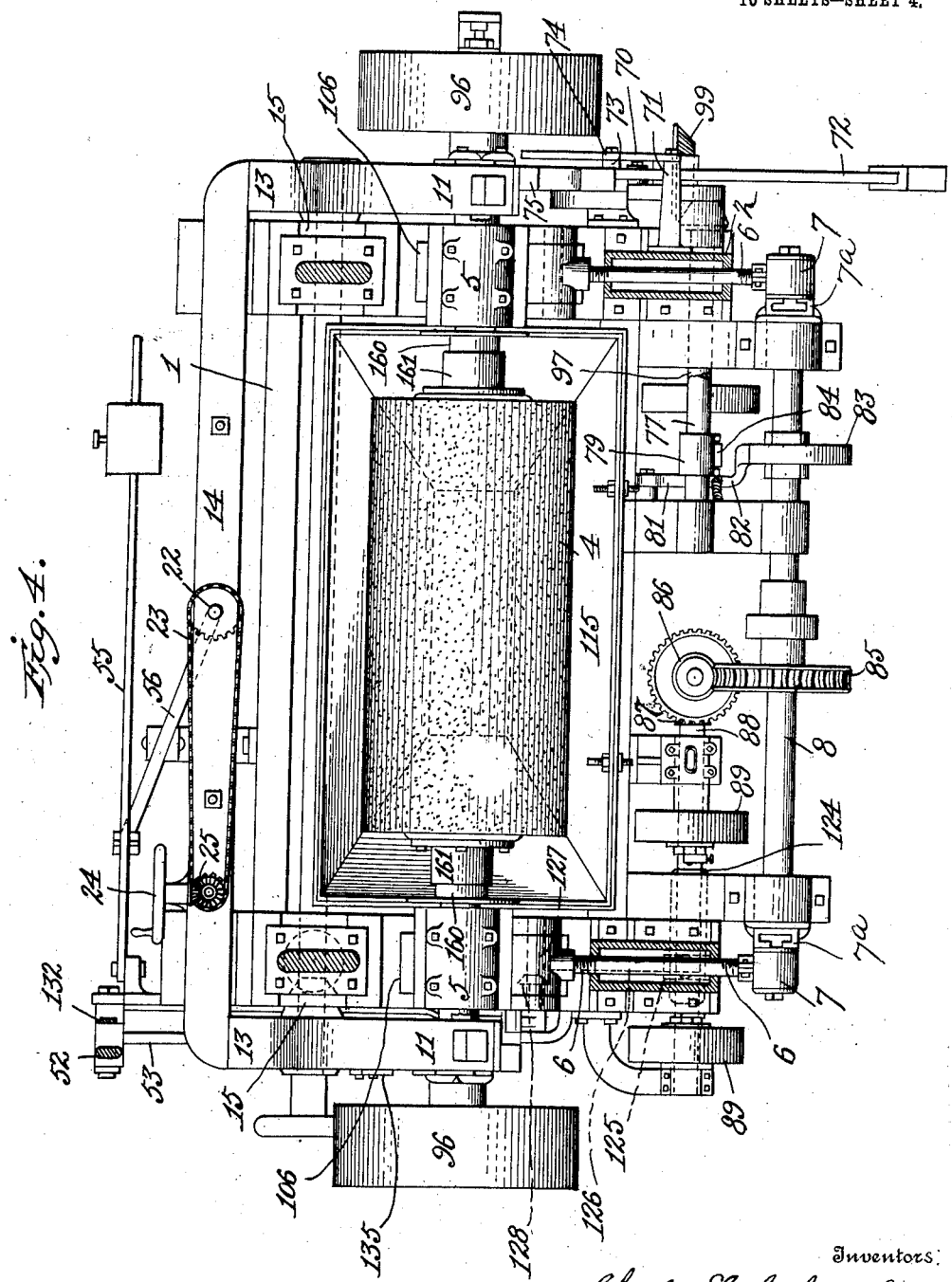

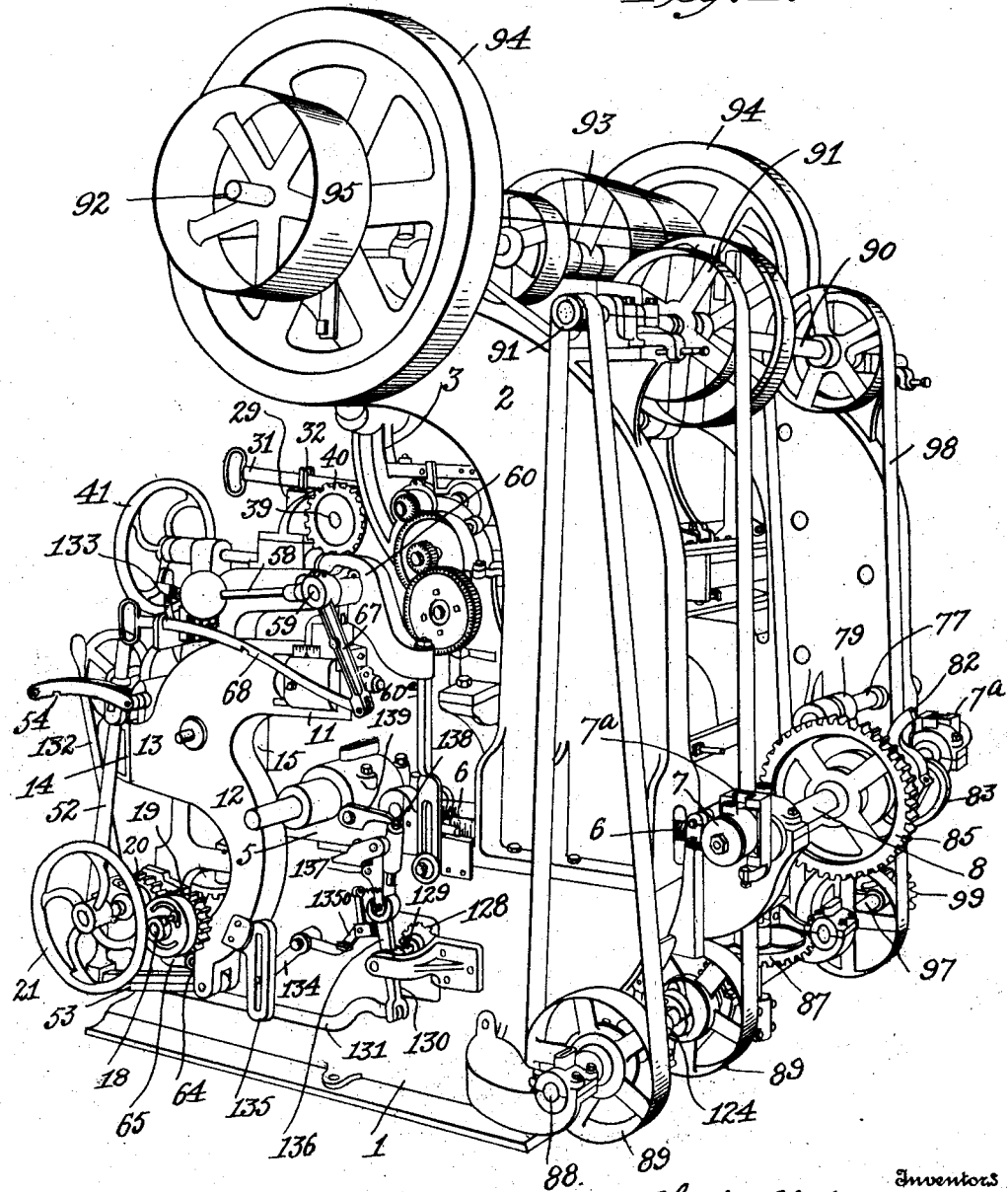

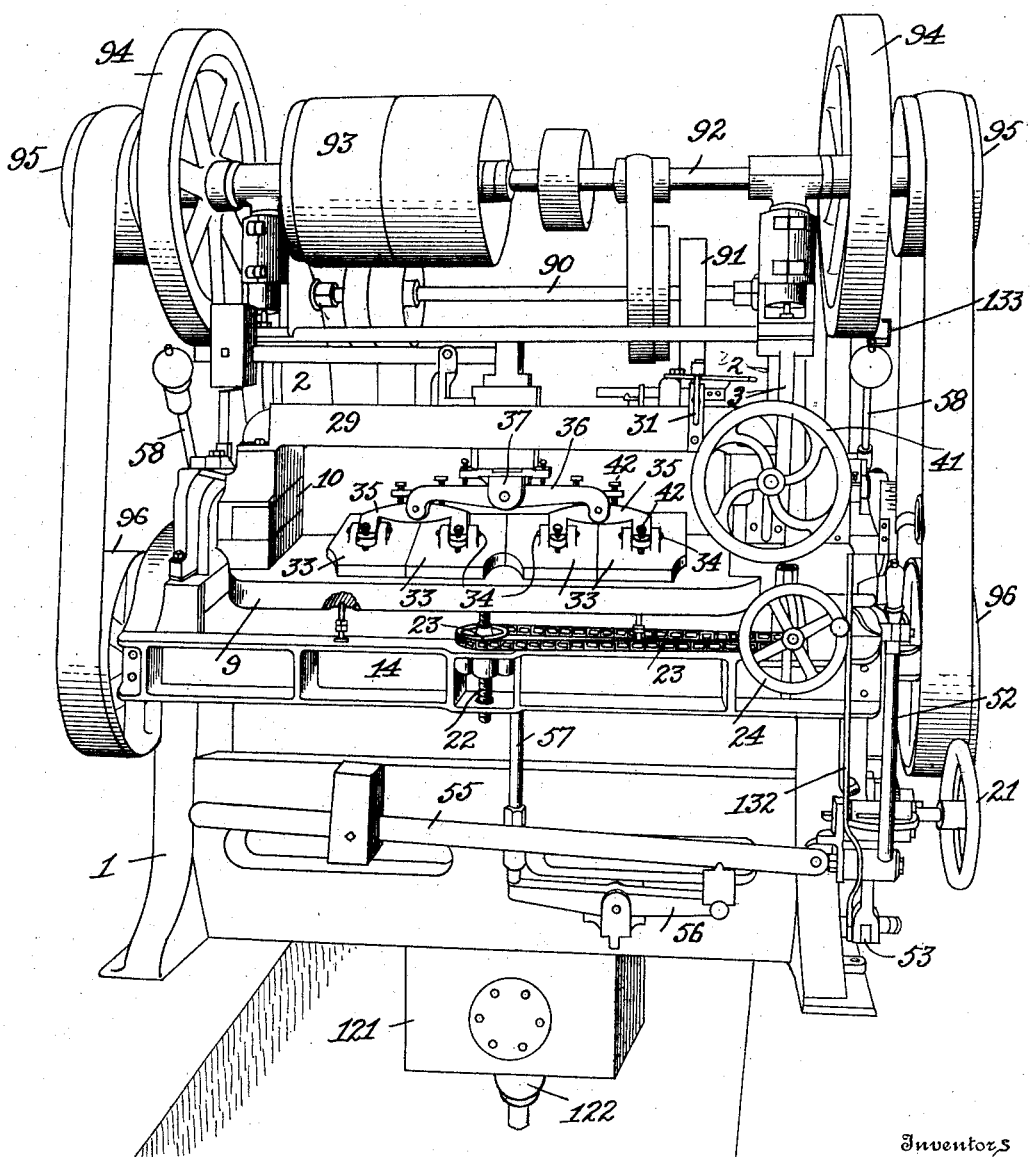

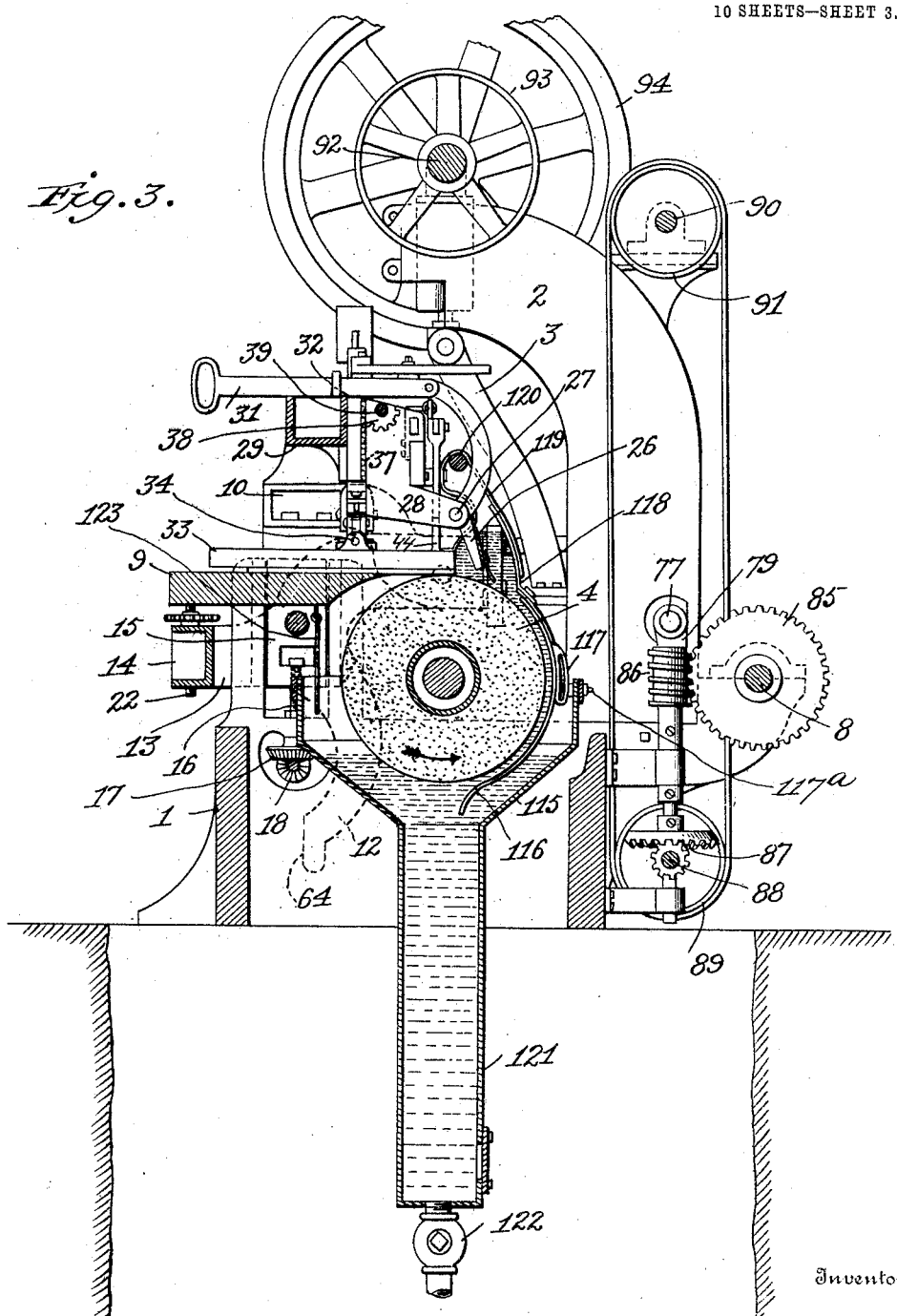

No. 893,795. PATENTED JULY 21, 1908.
C. L. GOEHRING & W. TROCHE.
GLASS GRINDING MACHINERY.
APPLICATION FILED JUNE 1, 1906.
10 SHEETS—SHEET 5.
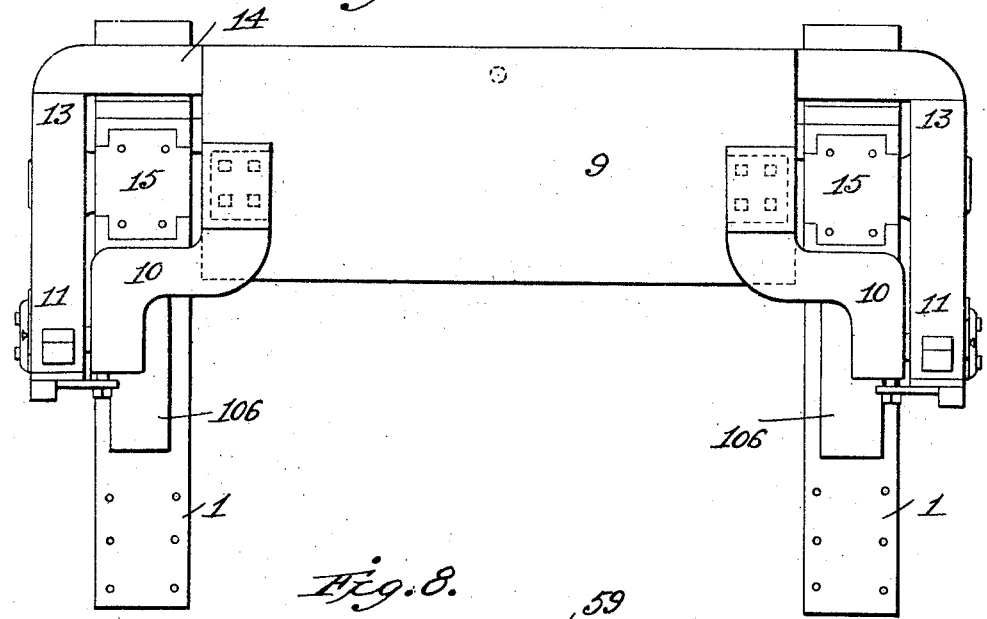
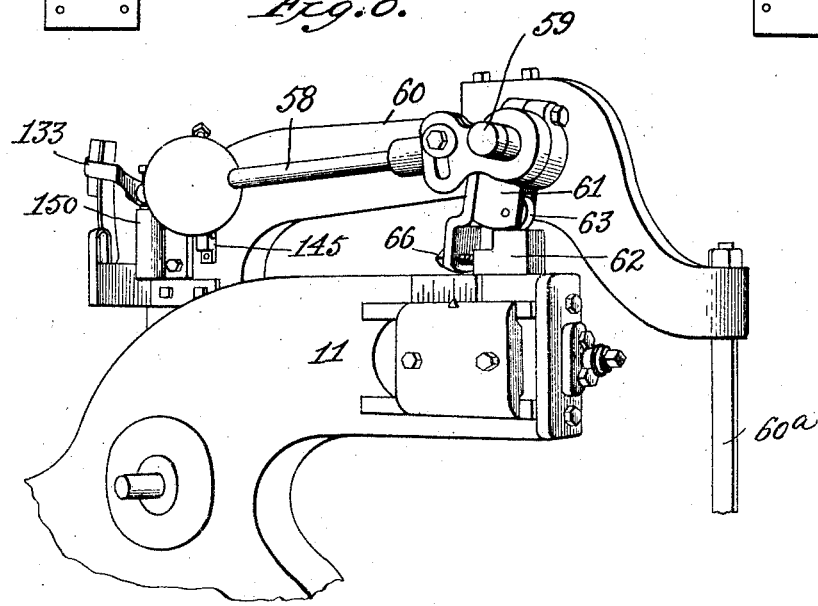

No. 893,795.
PATENTED JULY 21, 1908.
C. L. GOEHRING & W. TROCHE.
GLASS GRINDING MACHINERY.
APPLICATION FILED JUNE 1, 1906.
10 SHEETS—SHEET 6.
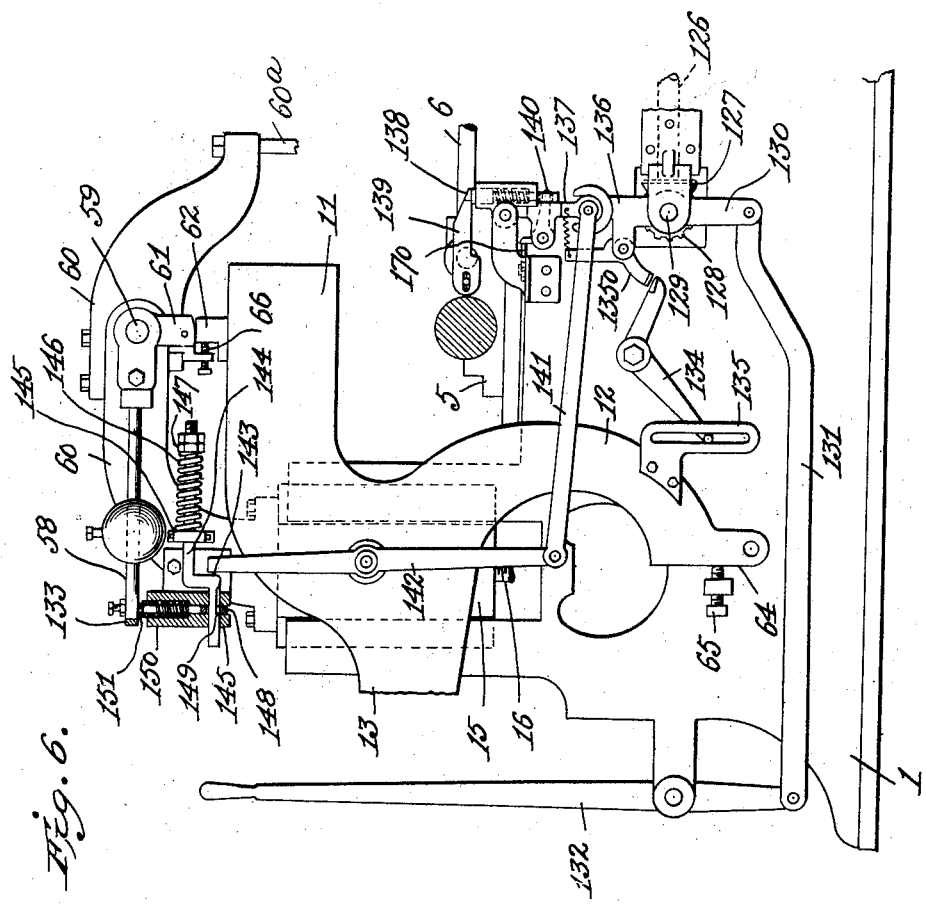

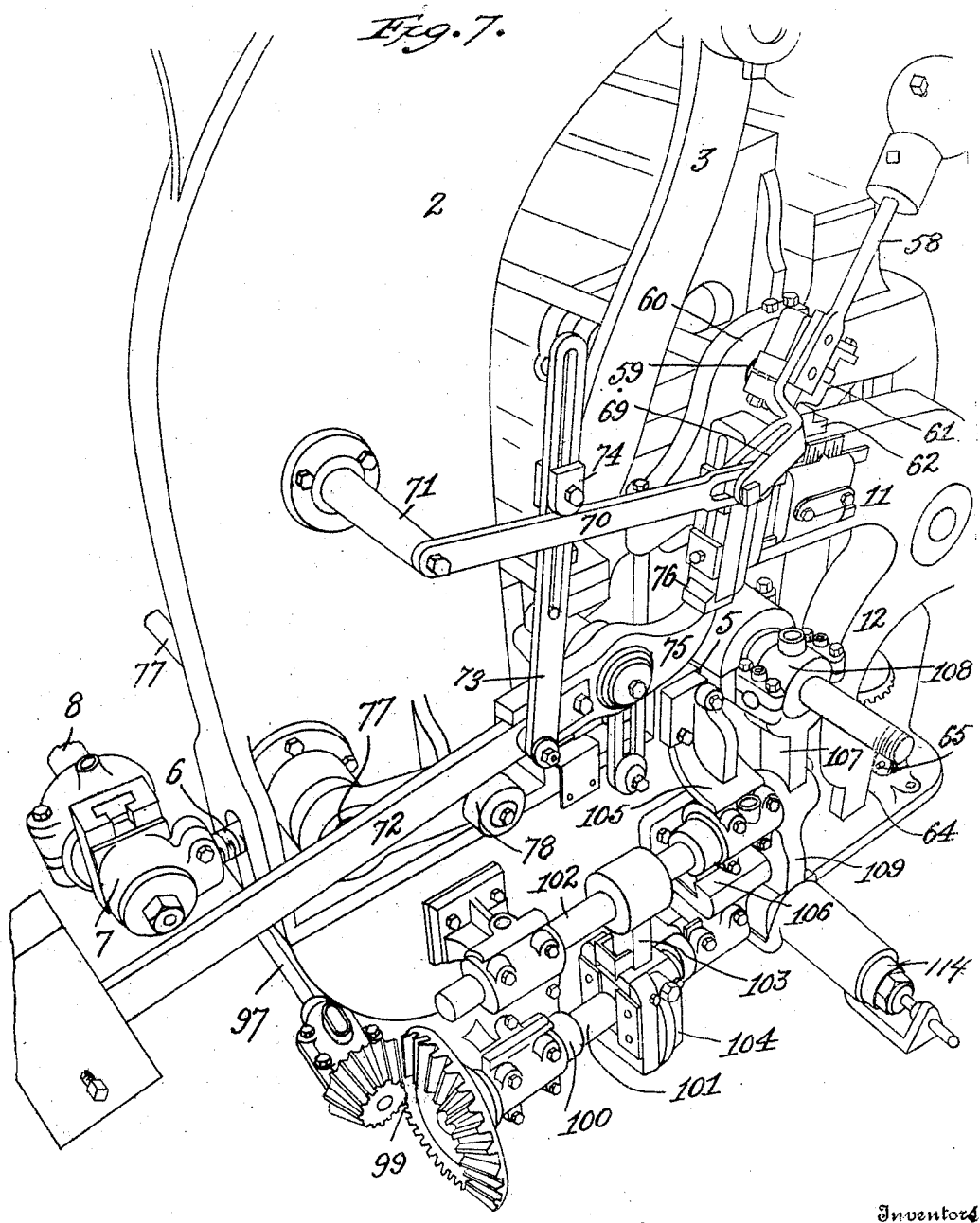

No. 893,795. PATENTED JULY 21, 1908.
C. L. GOEHRING & W. TROCHE.
GLASS GRINDING MACHINERY.
APPLICATION FILED JUNE 1, 1906.
10 SHEETS—SHEET 8.
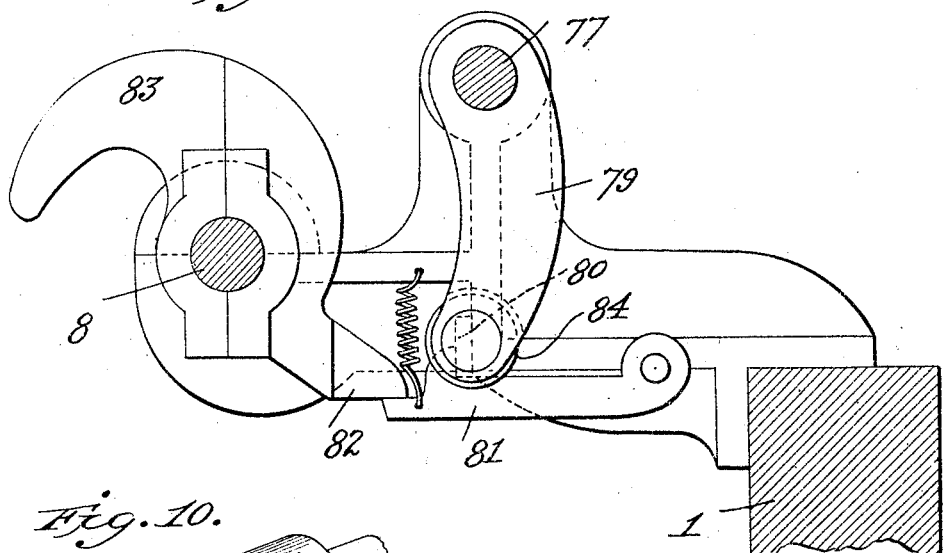
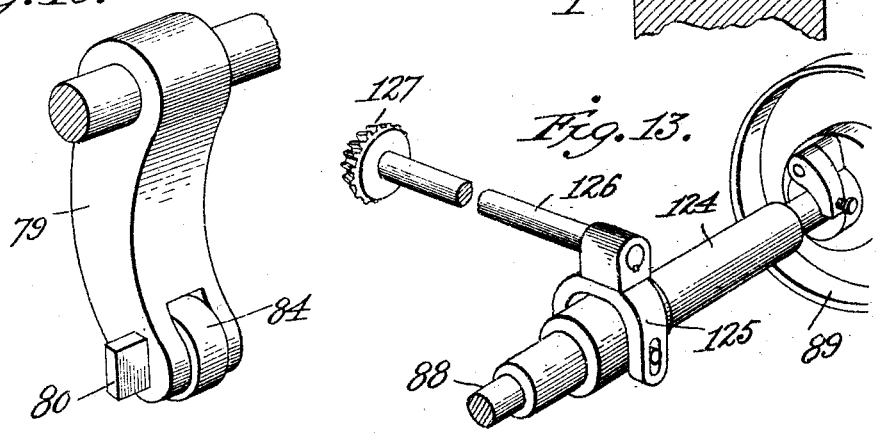
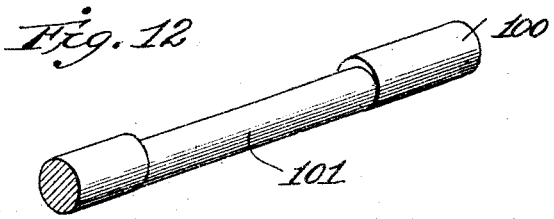
Witnesses
Edwin L. Yewell
Thomas Durant
Inventors
Charles L. Goehring and
William Troche
By Church & Church
their Attorneys

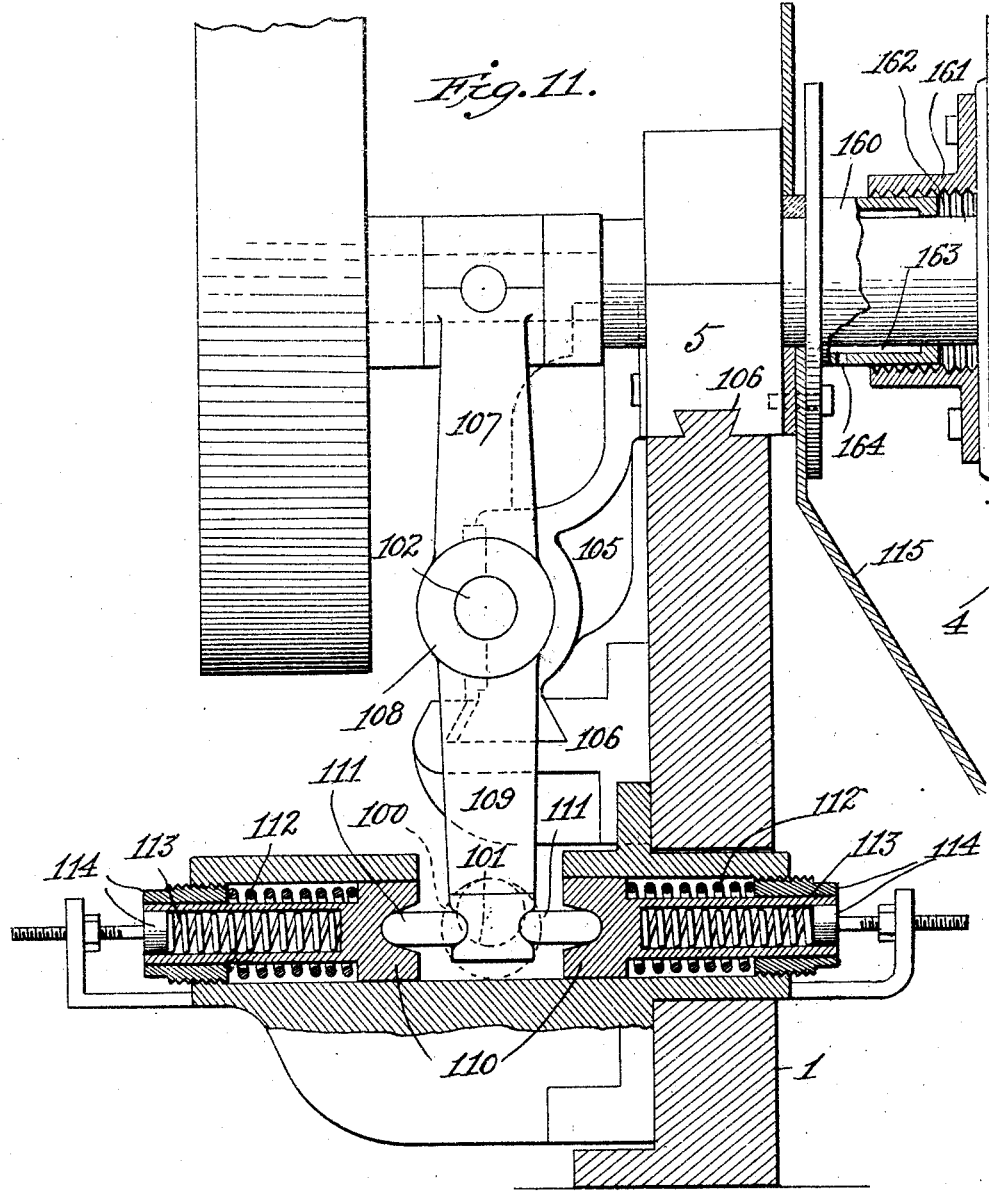

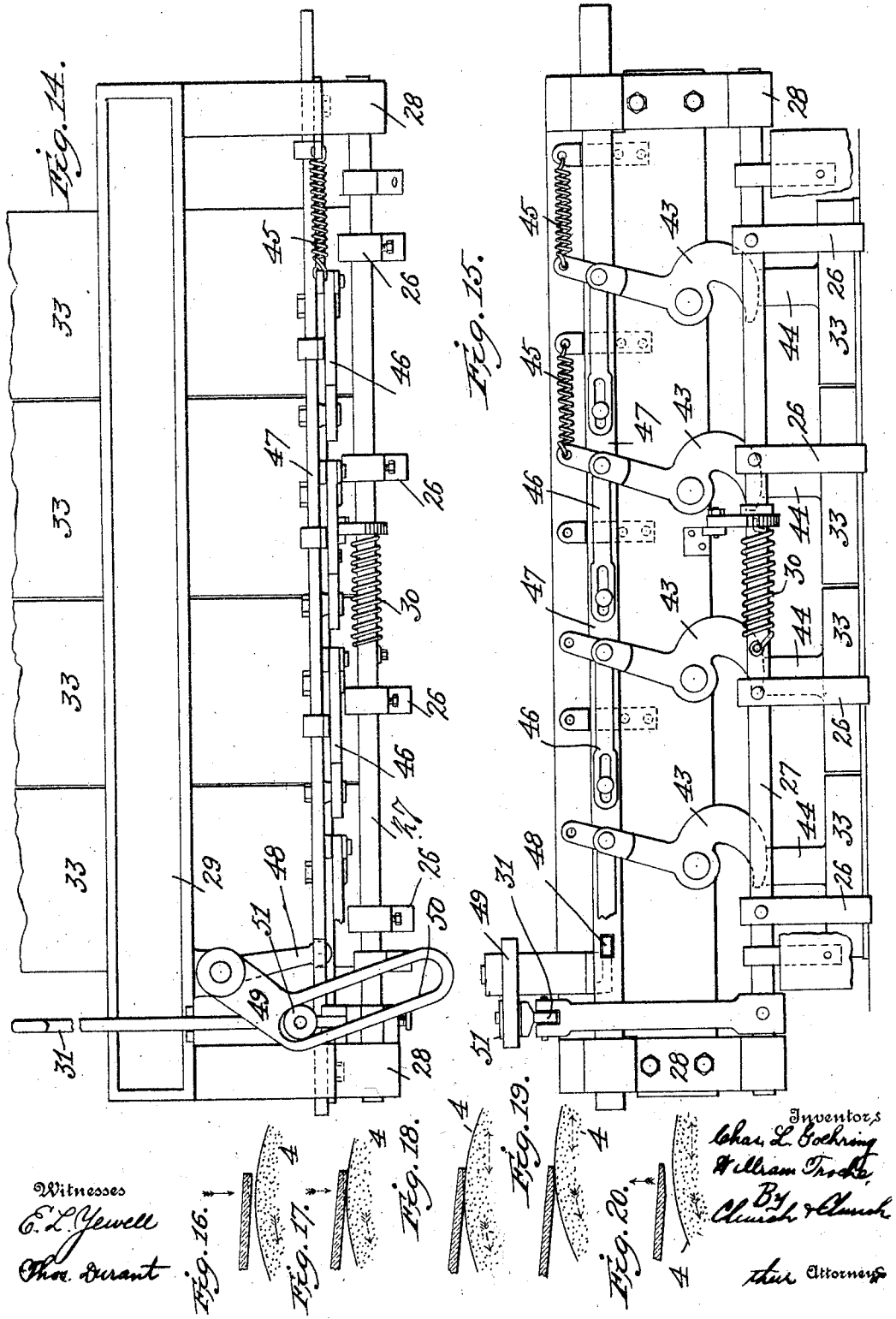

UNITED STATES PATENT OFFICE.

CHARLES LOUIS GOEHRING AND WILLIAM TROCHE, OF AKRON, OHIO; SAID TROCHE ASSIGNOR TO SAID GOEHRING.

GLASS-GRINDING MACHINERY.

No. 893,795. Specification of Letters Patent. Patented July 21, 1908.

Application filed June 1, 1906. Serial No. 319,783.

*To all whom it may concern:*

Be it known that we, CHARLES LOUIS GOEHRING and WILLIAM TROCHE, citizens of the United States, residing at Akron, in the county of Summit and State of Ohio, have invented certain new and useful Improvements in Glass-Grinding Machinery; and we do hereby declare the following to be a full, clear, and exact description of the same, reference being had to the accompanying drawings, forming a part of this specification, and to the figures and letters of reference marked thereon.

This invention relates to improvements in glass grinding and more especially to means for grinding bevels on the edges of plates of glass, the term "grinding", however, it will be understood, is intended to include not only the removal of the surplus material by rough cutting, but also the finishing of the cut surface to a greater or less degree.

Generally speaking, the invention contemplates the employment of a rotary grinder in connection with a glass support which is angularly adjustable in a frame, which latter is also angularly movable and bodily adjustable to effect the proper adjustments and presentation of the glass to the grinder.

The invention further contemplates the employment of mechanism whereby the grinding operation may be effected on the top portion of the grinder by a sequence of movements whereby the entry of dirt or grit between the grinder and surface being operated on is prevented, and by the rotation of the grinder itself, a body of water is supplied to the glass and grinder at the grinding point, sufficient in volume to maintain the leading edge of the glass submerged.

Referring to the accompanying drawings— Figure 1 is a perspective view of a glass grinding machine in which the present invention is carried into effect, certain overlying portions being omitted. Fig. 2 is a similar view looking at the front part of the machine. Fig. 3 is a vertical section in a plane from front to rear of the machine, with certain of the parts in elevation. Fig. 4 is a horizontal section looking downwardly on the grinder, the glass support and other parts being removed. Fig. 5 is a top plan view of the glass support and some portions of the frame shown in Fig. 4. Fig. 6 is a side elevation of a portion of the mechanism shown in Fig. 1, but on an enlarged scale, and showing certain parts omitted in Fig. 1. Fig. 7 is a perspective view, on an enlarged scale, looking at the rear portion of the machine and side opposite that shown in Fig. 1. Fig. 8 is a detail perspective view of a portion of the depressing mechanism for the glass support. Figs. 9 and 10 are detail views of portions of the lifting mechanism for the glass support. Fig. 11 is a detail sectional elevation of a portion of the mechanism for imparting axial movements to the grinder, Fig. 12 is a perspective view of the eccentric shaft employed in the mechanism illustrated in Fig. 11. Fig. 13 is a detail of the clutch operating mechanism whereby the fast and slow feed movements are controlled. Fig. 14 is a top plan and Fig. 15 a rear elevation of portions of the glass positioning and holding mechanism. Figs. 16 to 20, inclusive, are diagrammatic views illustrating the sequence of movements in grinding a bevel.

Similar letters of reference in the several figures indicate like parts.

The main frame embodies a base section 1 to which upwardly extending overhanging arms 2 are rigidly connected and braced by diagonally extending braces 3 so as to constitute a heavy rigid structure well calculated to withstand distortion and to eliminate as far as practicable any vibration of the moving parts such as might manifest itself on the ground surface of the glass and thereby destroy its optical effect or render the process of polishing more difficult. The grinder 4 which is in the form of either a continuous or sectional cylindrical body, is mounted on a shaft carried in bearings at each end embodying pillow blocks 5, said pillow blocks being mounted in ways so as to be capable of a movement transversely of the axis of the shaft and in a horizontal direction. This horizontal or feed movement of the grinder is effected by means of adjustable connecting rods 6 extending rearwardly from the pillow blocks and at their rear ends connected with adjustable crank arms 7 in cranks 7ª mounted on opposite ends of a crank shaft 8, to which rotary movement is imparted through driving mechanism to be presently described.

The glass support or table proper, indicated by the number 9, Figs. 2, 3 and 5, is provided with rearwardly extending arms 10 pivotally connected by an adjustable axis with the arms 11 of an angularly movable frame. Said angularly movable frame embodies side pieces having arms 11, 12 and 13, the arms 13 being connected by a cross piece or frame 14, Figs. 2 and 4. Said side pieces are journaled in vertically adjustable boxes or blocks 15, Fig. 3. The vertical adjustment of the bearings or blocks 15 in the main frame is effected by adjusted screws 16 journaled in the main frame and having mitergears 17 thereon while a cross shaft 18 carrying corresponding pinions or gears is provided for synchronizing the adjustment of the blocks. To rotate the cross shaft 18 it is provided at one end with an adjustable gear wheel 19 to which one of its mitergears is attached and a second gear wheel 20 controlled by a hand wheel 21 on a parallel shaft, is adapted to mesh with the gear wheel 19. By connecting the gear wheel 19 and the mitergear at that end of the shaft adjustably with the shaft, as shown in Fig. 1, the bearing blocks 15 may be readily brought into proper relative position either for leveling up the glass support or for bringing the axes of the side frames into exact alinement.

The angular adjustment of the table 9 in the angularly movable frame is preferably effected by a screw 22 interposed between the front of said table 9 and the cross piece 14, said adjustment being under manual control through a sprocket chain 23 extending off to one side of the table and adapted to be operated by a hand wheel 24 and mitergears 25 as shown in Fig. 4.

The glass to be beveled is clamped down to the table 9 and the surface of said table is so formed that the glass lying upon the same may project with the portion on which the bevel is formed coincident or substantially coincident with the axis of the table. Means are provided to facilitate the adjustment of the glass with its edge in the position referred to, such means preferably consisting of gage arms 26 on a shaft 27 journaled in brackets 28 carried by an arch 29 mounted on the table 9 as best seen in Figs. 2 and 3. The gage arms are preferably held down in position for the glass to coöperate therewith by a spring 30, Figs. 14 and 15 and are adapted to be moved in the opposite direction or elevated by a hand bar 31 having a notch therein for coöperation with a shoulder 32 on the arch, to hold the gage arms away from the glass, as shown in Fig. 3. The arch 29 also carries the clamping mechanism for pressing the glass down against the table or bed and this clamping mechanism is of such character that it will automatically adjust itself both to the angle of the glass and to any irregularity in the thickness of the glass. It is preferably composed of independently movable clamps 33 (preferably four) pivotally supported on transverse horizontal axes 34, from evener levers 35, the latter being in turn pivotally supported by a second or main evener lever 36. The evener 36 is pivotally supported by the lower end of a rack bar 37 mounted in vertical ways in the arch 29 and adapted to be raised and lowered by a pinion 38 on a transverse shaft 39 controlled by a worm wheel 40 and worm shaft and hand wheel 41 located at one end of the table in convenient position for the attendant to raise or lower the clamps as desired. The said clamps 33 and the evener levers 35 are limited in their swinging movements by adjustable stop screws 42, whereby they are held in proximate position when raised from the table and at the same time sufficient independent movement is permitted to enable them to adjust or adapt themselves to different plates or to glass of irregular thickness such as occurs in the commercial run of plate glass.

To guard against any possible yielding of the rear end of the clamps upwardly during the grinding operation, provision is made for applying direct pressure to the upper sides of said clamps over or in proximity to the grinding point and the mechanism for accomplishing this end preferably consists of a series of eccentrics 43 (Figs. 14 and 15) adapted to engage projections 44 on the upper sides of the clamps, said eccentrics being moved in proper direction to exert a downward pressure or conversely to prevent an upward movement of the clamps, by springs 45 engaging the upper ends of arms on the eccentrics. Inasmuch as it is important that the eccentrics should be released from engagement with the clamps when the clamps are to be elevated, they are all connected through loose or link connections 46 with an operating bar 47 adapted to be moved longitudinally by a crank arm 48 controlled by a second crank arm 49 having a slot 50 therein, in which a roller or projection 51 on the pull rod or bar 31 engages. The pull rod or bar 31, it will be remembered, operates the gage fingers 26 and through the connections just described, it operates the holding down eccentrics 43 in such manner that when the gage fingers are raised after the glass is in position and clamped, the eccentrics will be permitted to turn so as to perform their functions but upon the lowering of the gage fingers the said eccentrics will be thrown out of position for engagement with the clamps and consequently the clamps may be elevated.

Experience has demonstrated that in order to form a flat or plane bevel and at the time give the surface a finish free from scratches or "sand blasting" and which will correspond to the surface ordinarily secured by what is known as the smooth stone step in glass grinding—finishing the surface of the bevel up to what is known in the art as the white wheel—a certain definite procedure should be followed. The grinder should be rotated in a direction a cut from the outer to the inner edge of the bevel and the first feed movement should be substantially radial to the grinder, that is to say, the glass should be pressed down on the grinder until the grinder cuts away the glass to approximately the depth of some portions of the bevel, or until the front edge of the glass takes a bearing upon the grinder and forms a sharp abutment or guard edge for preventing the entry of grit or irregular particles between the glass and grinding surface. The mechanism is preferably so arranged that this condition exists when the inner edge of the bevel is cut as shown in Fig. 18 of the accompanying drawings. At this moment the initial feed or the movement of the glass toward the grinder is arrested and the grinder immediately given a feed movement toward the edge of the glass and parallel with the plane of the bevel to be formed. This feed movement should be continued until all of the surplus glass is removed clear to the edge of the plate at which instant, the glass should be immediately removed from the grinder as indicated in Figs. 19 and 20. By this procedure it is found that not only will a flat bevel be formed, but the whole surface of the bevel will be clear of irregular scratches and both edges of the bevel will be clean and free from what is known in the art as "sand blasting".

To effect the several operations automatically, mechanism is provided for feeding and controlling the several movements which mechanism is substantially as follows. The angularly movable frame is adapted to be tilted so as to lift the bed or table for the removal and insertion of the glass, by a hand lever 52 connected through a link 53 with the end of the arm 12 of said frame, thus by pulling forwardly on the hand lever 52, the frame is tilted to raise the bed, and a spring pawl or catch on the handle engaging a notch 54 in a segment of ordinary construction, serves to hold the parts in this position while the plates are being changed. A plate or plates having been clamped in position, the operator releases the handle and permits the frame to rock on its center to bring the glass into contact with the grinder. To insure an even and sufficient pressure upon the glass, two mechanisms are provided for tilting the frame forwardly, the first of said mechanisms embodying a weighted lever 55 (Fig. 2) bearing on an intermediate lever 56 and the latter in turn exerting its pressure upwardly on the under side of the cross frame 14 through a push rod 57. The second of said mechanisms consists of a pair of weighted levers 58 mounted on the ends of a transverse shaft 59 journaled in rigid arches 60 on the blocks 15. The weighted levers 58 are provided with cams or eccentric blocks 61 adapted to bear against wear blocks 62 on the upper sides of the arms 11 of the tilting frame, and in order to overcome friction and prevent undue wear, the said eccentrics 61 are preferably provided with antifriction rollers 63 which roll over or upon the upper surfaces of the wear blocks and serve to exert the required pressure in a downward direction. Obviously the weighted levers 58 may be arranged to exert a very heavy pressure, inasmuch as the eccentric surfaces are but slightly inclined with relation to each other and at the same time by applying the pressure at points directly above the axis of the bed or glass table, no yielding or vibration of the parts with relation to each other can take place. The inner ends of the arches 60 are preferably connected with the frame by connections 60ᵃ to eliminate any chance of yielding upwardly.

To arrest the downward feed or movement of the glass toward the grinder, the tilting frame is adapted to come into contact with or be arrested by stops adjustable to fixed position, thus the arms 12 on each side at their lower ends are formed with plane vertical surfaces 64 adapted to contact either directly or indirectly with adjustable stop screws or projections 65 and at the same instant that the arms 12 bring up against their stops, the weighted levers 58 are adapted to be arrested in their movement by adjustable stop screws 66, preferably contacting with the forward edges of the wear blocks 62 on the arms 11. This arrangement constitutes not only an effective depressing mechanism of great power and rigidity, but also an effective lock for overcoming any tendency of the glass to lift during the grinding operation.

The weighted levers 58 may be returned to their elevated position by a manual manipulation through the medium of an operating arm 67, (Fig. 1) on one end of the shaft 59 and a pull rod 68 connected at its rear end to the said operating arm, a suitable notch being provided in the pull rod for holding the weighted levers elevated, although in the preferred construction, the said weighted levers are elevated and the glass lifted away from the stone automatically in the operation of the machine and before the movements are arrested for the changing of the plates.

By reference to Fig. 7 it will be seen that the weighted lever 58 on the side of the machine opposite from that shown in Fig. 1 is provided with an arm 69 having a pin and slot connection with one end of a lever 70, the opposite end of said lever being pivoted on a stud or projection 71 on the arm 2 of the main frame 1. Immediately below the lever 70 is a weighted lever 72 also pivotally mounted on the arm 2 of the main frame and having an upwardly extending link 73 provided with an adjustable block 74 overlying the lever 70. The weight of the lever 72 greatly overbalances the weighted levers 58 and consequently when the lever 72 is free, it will immediately raise the levers 58 out of engagement with the tilting frame and free the latter for reverse movement. In addition to lifting the levers 58, the weighted lever 72 is also designed to tilt the frame and lift the glass away from the grinder. This result is accomplished by extending the shorter arm or nose 75 of the lever 72 forwardly to a point beneath an adjustable projection or foot 76 of the end of the arm 11 of the tilting frame, but sufficient freedom or play is left between the parts 75 and 76 to permit of the lighting of the weighted levers 58, as a preliminary step to the tilting of the frame for lifting the glass.

The weighted lever 72 is controlled in its movements, through a trip and lifting mechanism operated by the grinder feed shaft 8. Journaled in the arm 2 of the main frame is a lever operating shaft 77 extending parallel with the shaft 8 and having on its outer end a crank 78 passing under and adapted to lift the lever 72. On the shaft 77, within the frame, is an arm 79 (Figs. 9 and 10) having at one side a shoulder or projection 80 adapted to coöperate with a spring pressed catch or latch 81 and hold the shaft against rotation with the crank 78 in position to hold the weighted lever 72 up out of operation. The shaft 8 carries a trip arm 82, which at the proper point in the rotation of the shaft, engages the catch 81, forces the same out of engagement with the shoulder 80, and releases the weighted lever to permit it to act suddenly in elevating the glass away from the grinder. To restore the weighted lever to its normal position the shaft 8 is provided with a cam 83 adapted to engage the roller 84 in the arm 79, said cam 83 and roller 84 being in such relative position that the parts will be restored to initial position before the movement of the shaft 8 is arrested.

Motion is imparted to the shaft 8 by a worm gear 85, worm 86, bevel gears 87 and secondary countershaft 88. The secondary countershaft 88 is provided with two pulleys 89 both loose thereon, but adapted to be clutched thereto by mechanism to be presently described, and both belted to pulleys 91 on a primary countershaft 90, preferably located in bearings on the upwardly extending arms 2 of the main frame. The pulleys 89 and 91 are of differential size, whereby either fast or slow feed movement may be imparted to the shaft 88 and grinder, depending upon which one of the pulleys 89 is clutched to the countershaft. The primary countershaft 90 is driven from the main drive shaft 92 also located in bearings preferably on the said upwardly extending arms 2 of the main frame and adapted to be driven through fast and loose pulleys 93 of ordinary construction. The main drive shaft 92 is also preferably provided with heavy fly wheels 94, whose function it is to overcome any slight variation in power or to prevent variations in the speed of the grinder or in the feed movements, due to unusual resistance at any point inasmuch as such variations, it has been found, immediately manifest themselves in the surface being ground and produce ridges or depressions which while almost immeasurable, are nevertheless very apparent by reflected or refracted light. The rotary movement of the grinder is derived from the main drive shaft 92 through pulleys 95 at each end which are belted to pulleys 96 on each end of the grinder shaft, (one of said pulleys being omitted from the drawings in Fig. 1 in order to prevent obscuring the underlying parts). By locating the main power shaft immediately above the grinder, it will be seen that the horizontal feed movements of the grinder may take place without varying to any material degree the tension and power of the driving belts, and furthermore by the employment of relatively wide belts and pulleys a longitudinal or axial movement of the grinder may take place to produce more uniform and even results as is well understood in this art.

The mechanism for imparting the longitudinal or axial reciprocations to the grinder is best shown in Figs. 1 and 7 wherein it will be seen that a shaft 97 is connected by belt 98 with the countershaft 90, and at its end is connected by bevel gears 99 with a shaft 100 having an intermediate eccentric portion 101. An oscillatory shaft 102 journaled in bearings immediately above the shaft 100 is provided with an arm 103 carrying a box 104 embracing the eccentric 101 and having sliding contact therewith, whereby upon the rotation of the shaft 100, oscillatory movement will be imparted to the shaft 102. The shaft 100 is free not only to oscillate in its bearing on the main frame, but also to slide longitudinally therein. Longitudinal movement is imparted by a bearing 105 carried by the pillow block 5 in which the grinder is journaled, said bearing 105 being furthermore braced and supported in slide-ways 106 on the main frame. The shaft 102 is provided at its forward end with oppositely extending arms, the upwardly extending arm 107, Figs. 7, 11 being connected with the grinder shaft by a gimbal joint 108, whereby oscillatory movement of the shaft 102 will impart a longitudinal or axial reciprocation to the grinder but inasmuch as said axial movement of the grinder should be a quick movement, and as the grinder together with its shaft is of considerable weight, provision is preferably made for arresting the axial movement without throwing the strain incident thereto upon the driving mechanism. This result is best accomplished by the means shown in Fig. 11, and consisting of a downwardly extending arm 109 on the shaft 102, said arm 109 passing in between spring pressed buffers 110, pivotal blocks 111 being interposed to permit of the longitudinal movements of the shaft 102 or feed movements of the grinder. Said blocks 111 may be loosely held in position by the pressure of the spring buffers 110, and they will permit the arm 109 to slide between them without material consumption of power and without permitting rattle or loose vibration of the parts. The spring buffers 110 are preferably in the form of plungers adapted to be advanced by springs 112, 113 both having at their rear ends adjustable heads 114, whereby the pressure of said springs may be varied and their rates of vibration made non-synchronous so as to destroy as far as possible any tendency to maintain the vibration when the driving power ceases.

Between the pulleys 89 and on the shaft 88 is a sleeve 124, (Figs. 1 and 13) which sleeve when moved in one direction serves to clutch one of the pulleys 89 to the shaft 88 and when moved in the other direction correspondingly clutches the other of said pulleys to said shaft. The intermediate position of the sleeve leaves both of the pulleys free on the shaft. The sleeve 124 is moved longitudinally of the shaft 88, or held in its intermediate position, by the fork lever 125 on a rock shaft 126 journaled in the main frame and having at its forward end a bevel gear 127. Meshing with the gear 127 is a gear 128, Fig. 1, on a clutch operating shaft 129. The shaft 129 is provided with an arm 130 to which the rear end of a link 131 is connected, the forward end of said link being in turn connected with the lower end of a hand lever 132 extending up into convenient position for manipulation by the attendant who may thus grasp said lever and by the proper movement throw either of the pulleys 89 into engagement with the shaft 88 to rotate the shaft 8 by a fast or a slow movement. Normally, the shaft 8 stands with its crank arms in position to immediately inaugurate the rearward feed of the grinder when motion is imparted to the shaft, and in operation the attendant observing the descent of the levers 58 by watching the gage or pointer 133, moves the lever 132 at the proper instant to throw the slow feed pulley into engagement with the shaft 88 and thereby start the slow feed of the stone rearwardly. When the stone has moved rearwardly the proper distance, the lifting mechanism for the glass becomes effective to tilt the glass carrying frame and provision is made whereby the tilting movement of said frame, will automatically shift the clutch for bringing the fast feed into operation for completing the movement of the grinder back to normal position and for then disengaging the clutch to arrest the feed movement of the grinder in proper normal position.

A bell crank lever 134 is journaled on the side of the main frame, in position for a pin on one of its arms to engage the slotted projection 135 on the arm 12 of the tilting frame, and for the other of its arms to engage a spring pressed pawl or arm 1350 on an upwardly extending arm 136 carried by the clutch operating shaft 129. With this arrangement, the said clutch operating shaft may be thrown by the attendant in one direction, i. e., to connect in the slow feed, and it will be automatically thrown in the opposite direction, i. e., to connect in the fast feed by the movement of the arm 12 on the tilting frame and then through mechanism to be now described back to its intermediate position to arrest the feed of the stone when the stone reaches its normal position. The return of the clutch to intermediate position is effected through a connection between the movable pillow block 5 and the clutch shaft operating arm 136. This connection embodies a lever 137 journaled in a bracket on the frame and having a pivotal connection with the upper end of the arm 136. By reference to Figs. 1 and 6 it will be seen that the lever 137 carries a sliding spring pressed pawl 138 adapted to project into the path of an adjustable projection 139 on the pillow block 5 whereby when said pillow block is moving rearwardly the projection will engage the pawl and move the upper end of the arm 136 toward the front of the machine until the clutch sleeve is in intermediate position and the drive pulleys disconnected. To permit of the necessary movement of the clutch operating shaft 129 for coupling in the slow feed, and to permit the feed movement of the grinder, the said lever 137 is provided with the bell crank lever 140, one arm of which engages the pawl 138 and the other arm of which rests, when the parts are in normal position and no feed taking place, against the adjustable stop 170, on the fixed frame of the machine. With this arrangement the swinging of the clutch shaft 129 in a direction to couple in the slow feed, will withdraw the pawl 138 from the path of the projection 139 and the parts will remain in this position until the bell crank lever 134 is operated by the lifting of the glass to throw the clutch operating shaft to the other extreme of its movement. When this occurs, the pawl 138 will pass beneath and slide along the under side of the projection 139 until the grinder makes its forward excursion and releases said pawl, whereupon as the grinder begins again to move rearwardly and approaches its normal position of rest, the said projection 139, will engage the pawl 138 and return the clutch operating shaft and sleeve to their intermediate positions.

While the attendant may, through the hand lever 132, shift the clutch to inaugurate the grinder feed at the proper instant, it is preferred that this operation shall be performed automatically, inasmuch as any dwell after the glass has completed its movement toward the grinder will result in forming a ridge or depression in the glass, but if the grinder feed is immediately inaugurated, no such ridge or depression is apparent even by reflected or refracted light. To accomplish the result automatically, it is obvious that the swinging movement of the tilting frame may be utilized to release an automatic clutch shifting device, or any of the parts moving in unison with the glass feed may be similarly utilized. In the preferred construction, the weighted levers 58 are utilized as the direct releasing means for the automatic clutch shifter, thus, as shown in Fig. 6, the clutch operating levers 136 and 137 are pivotally connected through a link 141 with the lower end of a lever 142 preferably pivoted or journaled on an extension of the axis of the tilting frame. The upper end of the lever 142 projects in front of a shoulder 143 on a sliding bolt 144 mounted in bearings 145 on the arch 60. The sliding bolt 144 is adapted to be moved in one direction by a spring 146 preferably interposed between one of the bearings 145 and an adjustable nut 147 on the bolt, whereby the tension of the spring may be regulated. When moved under the influence of the spring 146, the shoulder 143 coöperating with the upper end of the lever 142 will shift the clutch operating shaft in proper direction to inaugurate the slow feed movement of the grinder. Normally, the bolt 144 is held against movement under the influence of its spring, by a vertically arranged spring pressed catch 148 which coöperates with a shoulder 149 on the bolt, said bolt, however, being free to move in the opposite direction in order to permit of a reverse movement of the lever 142 when the fast feed of the grinder is inaugurated by the upward tilting of the frame to lift the glass away from the grinder as before explained. The spring pressed catch 148 projects upwardly through its housing 150 in position to be engaged and depressed by an adjustable knocker 151 on the weighted lever 58 and it is obvious that, as said lever 58 descends pressing the glass toward the grinder, it will, at a certain point in its movement, engage the catch and release the clutch operating mechanism and, by adjusting the knocker 151 and stops 65 and 66 to bring the tilting frame and levers to rest at the exact instant when the clutch operating mechanism is released, the feed movement of the grinder will be inaugurated at the proper instant to give the desired results. The parts illustrated in Fig. 6 have been omitted from Figs. 1 and 8 inasmuch as by including them in these figures confusion in the illustration would result.

Suspended under the grinder is a water receptacle or tank 115 said receptacle being preferably connected with the pillow blocks 5 (see Fig. 11) so as to be movable with said pillow blocks in the feed movement of the grinder, although the said grinder reciprocates axially independently of said tank. It is designed that the tank shall be filled with water to a sufficient depth to immerse the lower portion only of the stone and in order to carry a volume of water up to the grinding point sufficient to completely immerse the leading edge of the glass, together with the forward edges of the clamp and grinder at the grinding point, a guard is provided substantially concentric with the grinder and in such proximity thereto that the space between said guard and grinder will be filled with water being carried up by the rotation of the grinder. This guard is indicated by the number 116 (Fig. 3) and is preferably adjustably mounted by a slot and bolt connection 117 the bolt 117$^a$ being adjustable longitudinally so as to be adjustable both vertically and toward and from the grinder, whereby the space between the grinder and guard may be varied to suit special conditions of work, or to compensate for the wearing away of the grinder. The lower edge of the guard extends well down below the water level and is turned away from the grinder to form a converging space between the grinder and guard into which the water will be drawn and carried forwardly between the two. From the upper edge of the guard 116 a supplemental adjustable guard 118 projects upwardly to form the rear wall of a chamber at the grinding point. To the rear ends of the clamps 33, one edge of a flexible apron 119 is attached preferably by separate connections with each clamp to permit of a slight relative movement of the clamps. Said apron is provided with tight fitting apertures for the guard fingers and extending up over a bar or shaft 120 and thence down outside of the supplemental guard 118. This flexible apron 119 forms the front and top wall of the water chamber above the grinder and effectually prevents the splashing or escape of the water toward the front or rear of the grinder. In practice it is found that the water drawn up by the grinder accumulates in the chamber and finds its only free escape at the ends of the grinder, a very large volume of water will be caused to flow up to the top of the grinder and accumulates in a body, finally making its escape back into the tank over the ends of the grinder and carrying off with it all detritus. The conditions produced prevent the breakage of glass, probably due to the fact that an absolutely uniform and even temperature is maintained at the grinding point, but the result accomplished it is found cannot be accomplished by discharging streams of water on to the grinder at the grinding point and hence it is thought that the presence of a body of water is of great importance.

To prevent grit and detritus from being sucked up with the water and carried to the upper side of the stone, the tank 115 is provided with a relatively deep depending leg or sediment chamber 121, which chamber is made of sufficient depth to permit sediment to settle entirely out of the influence of the grinder and provision is made for drawing off sediment through a drain cock 122 at the bottom of the tank.

To prevent water from being thrown over the front of the tank a depending or hanging guard 123 is provided on the under side of the table or glass support, in position to deflect any water thrown off by the grinder downwardly into the tank and such guard being free to swing need not be connected with the tank itself. By the use of said guard at the forward side of the grinder and of the flexible apron 119 on the rear side of the grinder, the feed movements of the grinder itself are free and unobstructed and at the same time, water is prevented from escaping at any point where it will inconvenience the attendant, or interfere with the effectual operations of the machine.

To prevent water and grit carried thereby from working its way into the grinder shaft bearings a shield sleeve 160 (Fig. 11) is mounted on each bearing 5 around the shaft while a similar shield sleeve 161 is mounted on each end of the grinder in position to overlap and telescope with the first mentioned sleeve. The sleeves 161 are internally screw threaded as at 162 the threads at opposite ends of the grinder being respectively right and left hand threads, relatively coarse but of short pitch. They are so mounted with relation to the direction of rotation of the grinder that the rotation of the grinder will discharge any water or other substance at the end of the sleeve. Each pair of sleeves thus acts as a screw pump having a constant tendency to prevent the entry of anything between the sleeves. As a further precaution the inner sleeve 160 is provided with an internal chamber 163 around the shaft and if desired the chamber may have a drain aperture 164 on the under side.

The train of gears 500 shown in Fig. 1 are part of a grinder dressing mechanism forming no part of the present invention and specific description is not necessary but they constitute the visible portion of said mechanism in the complete machine shown in Fig. 1.

Having thus described our invention, what we claim as new and desire to secure by Letters Patent, is:—

1. In glass grinding machines, the combination with the rotary grinder and means for giving said grinder a bodily feed movement transversely of its axis, of a glass support movable to feed the glass toward the grinder, mechanism for automatically moving the glass support to feed the glass to the grinder during the initial grinding operation and for arresting the movement of the glass, and mechanism for giving the grinder a bodily feed movement transversely of its axis when the glass support comes to rest.

2. In glass grinding machinery, the combination with the grinder and glass support having feed movements with relation to each other in two directions, of mechanism for moving said grinder and support toward each other during the initial grinding and for arresting said movement and then moving said support and grinder transversely with relation to each other and parallel with the plane of the surface being ground; substantially as described.

3. In glass grinding machinery the combination with the rotary cylindrical grinder having a bodily traverse transverse of its axis and a glass support having a feed movement toward the grinder, of feed mechanism for automatically feeding the glass support toward the grinder to effect the initial grinding operation and feed mechanism controlled by the glass feeding mechanism for feeding the grinder transversely of its axis parallel with the plane of the surface being ground to effect the final grinding operation; substantially as described.

4. In glass grinding machinery the combination with the grinder having a bodily feed movement, of a glass support movable toward and from the grinder and feed mechanism for the grinder controlled through the movement of the glass support toward the grinder, whereby the feed movement of the grinder will be inaugurated when the glass support reaches a predetermined position; substantially as described.

5. In glass grinding machinery, the combination with the rotary grinder having a bodily feed movement transversely of its axis, of a glass support movable toward and from the grinder and feed mechanism for the grinder controlled through the movement of the glass support toward the grinder, to inaugurate the grinder feed movement; substantially as described.

6. In glass grinding machinery, the combination with the rotary cylindrical grinder having a bodily feed movement transversely of its axis, of a glass support angularly movable toward and from the grinder and grinder feed mechanism controlled by the angular movement of the glass support; substantially as described.

7. In glass grinding machinery, the combination with the rotary cylindrical grinder having a bodily feed movement transversely of its axis, of a tilting frame, a glass support carried by said frame to move toward and from the grinder, a feed mechanism for the grinder embodying a clutch and clutch operating mechanism controlled by the movement of the glass support; substantially as described.

8. In glass grinding machinery, the combination with the grinder, of a glass support, a pivoted tilting frame carrying the glass support and movable on its axis to feed the glass toward the grinder and a weighted lever coöperating with said frame to turn the same on its axis and feed the glass; substantially as described.

9. In glass grinding machinery, the combination with the grinder, of a glass support, a pivoted tilting frame carrying the glass support and movable on its axis to feed the glass toward the grinder, a weighted lever and coöperating eccentric surfaces interposed between the lever and frame whereby the lever operates to turn the frame and thereby feed the glass; substantially as described.

10. In a glass grinding machine, the combination with the rotary grinder movable transversely of its axis, of a glass support, a tilting frame carrying the glass support and movable on its axis to feed the glass toward the grinder, a weighted lever for tilting said frame to feed the glass, feed mechanism for the grinder and controlling devices interposed between said grinder feed mechanism and the weighted lever, whereby the movement of the lever inaugurates the grinder feed.

11. In a glass grinding machine, the combination with the rotary grinder movable transversely of its axis parallel with the plane of the surface being ground and mechanism for moving said grinder embodying a clutch, of a glass support, a tilting frame carrying the glass support and movable on its axis to feed the glass toward the grinder, a weighted lever coöperating with said frame to feed the glass toward the grinder and an automatic clutch operating mechanism released by said weighted lever; substantially as described.

12. In a glass grinding machine, the combination with the rotary grinder movable transversely of its axis parallel with the plane of the surface being ground and a feed mechanism for said grinder embodying a clutch, of a glass support, a tilting frame carrying the glass support and movable on its axis to feed the glass toward the grinder, a weighted lever for tilting said frame to feed the glass, an automatic clutch shifting mechanism, a catch for holding said clutch shifting mechanism in restraint and means whereby the movement of the weighted lever releases said catch to permit of the operation of the clutch for inaugurating the grinder feed.

13. In a glass grinding machine, the combination with the rotary grinder movable transversely of its axis parallel with the plane of the surface being ground, a glass support and a tilting frame carrying said glass support, of a feed mechanism for the grinder embodying fast and slow gearing, a clutch and a clutch operating mechanism embodying connections with the tilting frame for shifting said clutch to inaugurate the high speed of the feed mechanism and a trip connection with the grinder bearings for shifting said clutch to an intermediate position for arresting the grinder feed; substantially as described.

14. In a glass grinding machine, the combination with the rotary grinder movable transversely of its axis parallel with the plane of the surface being ground, a glass support and a tilting frame in which said glass support is mounted to move toward and from the grinder, of a grinder feed mechanism embodying fast and slow speed gearing and a clutch and connections between said clutch, tilting frame and grinder bearings whereby when the tilting frame is moved to feed the glass toward the grinder the slow speed gearing will be thrown into operation, when the tilting frame is turned to move the glass away from the grinder the high speed gearing will be thrown into operation and when the grinder bearings are returned to normal position the feed gearing will be disconnected to arrest the feed of the grinder.

15. In a glass grinding machine, the combination with the grinder, glass support and tilting frame in which said glass support is mounted to move toward and from the grinder, of a weighted lever for moving said tilting frame to lift the glass away from the grinder, a grinder feed operating mechanism and a supporting mechanism for said weighted lever operated by the grinder feed mechanism to release said lever at a predetermined point in the grinder feed movement; substantially as described.

16. In a glass grinding machine, the combination with the rotary grinder movable transversely of its axis parallel with the plane of the surface being ground, a glass support, and a movable frame in which said glass support is mounted to move toward and from the grinder, of a grinder feed operating mechanism, a lifting mechanism for the frame of the glass support and connections between said grinder feed operating mechanism and said lifting mechanism whereby the glass will be lifted away from the grinder at a predetermined point in the movement of the grinder.

17. In a glass grinding machine, the combination with the rotary grinder movable transversely of its axis parallel with the plane of the surface being ground and a glass support having a feed movement toward and from the grinder, of an elevating mechanism for said glass support controlled by the grinder feed operating mechanism, whereby the glass will be elevated away from the grinder at a predetermined point in the movement of the grinder.

18. In a glass grinding machine, the combination with the rotary grinder and glass support movable toward and from the grinder, of a weighted lever for lifting said glass support away from the grinder, a lifting mechanism for said weighted lever and a catch for holding said lifting mechanism under restraint with the lever elevated, said catch being controlled by the grinder operating mechanism.

19. In a glass grinding machine, the combination with the rotary grinder movable transversely of its axis parallel with the plane of the surface being ground and a glass support movable toward and from the grinder, of a weighted lever for lifting said glass support away from the grinder, a shaft controlling the feed movements of the grinder, an elevating mechanism for said weighted lever operated by said shaft, a catch for holding said lever elevated and means whereby said catch will be released at a predetermined point in the feed movement of the grinder; substantially as described.

20. In a glass grinding machine, the combination with the rotary grinder movable transversely of its axis parallel with the plane of the surface being ground and glass support movable toward and from the grinder, a weighted lever for moving said glass support toward the grinder, a weighted lever for moving said glass support away from the grinder, connections between said levers whereby the movement of the latter elevates the former preliminary to the elevation of the glass support and operating connections whereby said elevating lever will be released for operation at a predetermined point in the movement of the grinder.

21. In a glass grinding machine, the combination with a grinder and a glass support movable toward and from the grinder, of separate automatic depressing and elevating mechanisms for said glass support, connections between said mechanisms whereby one will be restored to its initial position by the operation of the other and driving mechanism for automatically restoring the latter to its initial position.

22. In a glass grinding machine, the combination with the grinder, the glass support movable toward and from the grinder, the weighted lever for moving said glass support toward the grinder and the weighted lever of superior power for moving said glass support away from the grinder, of a connection between said levers embodying a link whereby the glass elevating lever will restore the depressing lever to its initial position preliminary to the lifting of the glass and a driving mechanism for automatically returning the glass elevating lever to its initial position; substantially as described.

23. In a glass grinding machine, the combination with the rotary cylindrical grinder movable transversely of its axis, of a water tank suspended below and movable transversely with said grinder and a guard arranged substantially concentric with the grinder and extending from a point below the grinder around the rear side and to a point near the top of the grinder to form a channel in which the water will be elevated by the rotation of the grinder and supplied to the grinder at the grinding point; substantially as described.

24. In a glass grinding machine, the combination with the rotary cylindrical grinder, a tank surrounding the lower portion of said grinder and a glass support for presenting the glass to the upper portion of the grinder, of a guard arranged substantially concentric with and in proximity to the grinder on the upwardly moving side thereof to form a narrow water channel in which the water will be elevated from the tank to the upper side of the grinder; substantially as described.

25. In a glass grinding machine, the combination with the rotary cylindrical grinder, the tank suspended on the under side of the grinder and the glass support located in position to present the glass to the upper side of the grinder, of the upwardly extending guard secured at one edge to the glass support for preventing the flow of water forwardly over the glass and its support; substantially as described.

26. In a glass grinding machine, the combination with the rotary cylindrical grinder, the tank suspended on the under side of the grinder and the glass support located in position to present the glass to the upper side of the grinder, of the flexible apron secured at one end to the glass support and forming an upwardly extending guard for preventing the flow of water over the glass and its support.

27. In a glass grinding machine, the combination with the rotary cylindrical grinder, the tank suspended on the under side of the grinder and the glass support located in position to present the glass to the upper side of the grinder, of the concentric guard arranged in proximity to the upwardly moving side of the grinder to form a narrow water channel and the upwardly extending guard interposed between said concentric guard and glass support to form a chamber on the upper side of the grinder in which a body of water may accumulate.

28. In a glass grinding machine, the combination with the rotary grinder, tank in which the lower portion of said grinder runs and a glass support in position to present the glass to the upper side of the grinder, of a substantially concentric guard extending around the upwardly moving side of said grinder from a point within the tank to a point in proximity to the glass support and an upward extension of said guard forming a chamber for the accumulation of a body of water; substantially as described.

29. In a glass grinding machine, the combination with a grinder and a glass support embodying clamping means for holding the glass when positioned, of movable gage fingers against which the glass is positioned and a water guard movable with said fingers whereby when said fingers are turned into position for positioning the glass said guard will be in position to prevent the flow of water over the glass; substantially as described.

30. In a glass grinding machine, the combination with the grinder, the glass support movable toward and from the grinder and embodying clamping means for holding the glass when positioned of gage fingers movable toward and from the support for determining the position of the glass on the support and means for holding the support against yielding upwardly, embodying movable members controlled by the gage finger operating mechanism to engage the support when the gage fingers are turned out of operative position.

31. In a glass grinding machine, the combination with the grinder and the glass support embodying clamping means, of means for holding said support against upward yielding, embodying a series of movable members having eccentric faces; substantially as described.

32. In a glass grinding machine, the combination with the grinder, the glass support and a series of clamping members overlying said support for clamping the glass in position thereon, of a series of eccentrics one for each clamp overlying the forward ends of said clamps and mechanism for simultaneously moving said eccentrics whereby the clamps may be held against yielding upwardly or released for manipulation to permit of the removal of the glass.

33. In a glass grinding machine, the combination with the grinder, the glass support and clamps movable toward and from said support, of a series of spring pressed eccentrics corresponding in number to the number of clamps and located in position to coöperate with the forward ends of said clamps for preventing them from yielding upwardly and means for simultaneously releasing all of said eccentrics from engagement with the clamps.

34. In a glass grinding machine, the combination with the rotary grinder, of a mechanism for imparting axial reciprocation to said grinder embodying a power shaft, eccentric and connecting levers and spring buffers for checking the movement of the grinder in both directions; substantially as described.

35. In a glass grinding machine, the combination with the grinder movable axially in its bearings, of a mechanism for moving said grinder axially embodying a shaft having arms thereon one adapted to engage the grinder shaft and the other coöperating with a power driven eccentric and spring buffers coöperating with an arm on said shaft to retard the movement of the grinder in each direction; substantially as described.

36. In a glass grinding machine, the combination with the grinder movable transversely of its axis and also movable axially, of a mechanism for moving said grinder axially embodying an oscillatory and longitudinally movable shaft, an arm on said shaft coöperating with the grinder shaft, and projecting between oppositely disposed spring pressed buffers between which it is free to move transversely of the grinder axis, whereby the axial movements of the grinder will be retarded in each direction; substantially as described.

CHARLES LOUIS GOEHRING.
WILLIAM TROCHE.

Witnesses:
H. M. HOLLINGER,
E. T. HITCHCOCK.